United States Patent
Stimler

[11] 3,903,496
[45] Sept. 2, 1975

[54] OPTO-ACOUSTIC HYDROPHONE

[76] Inventor: Morton Stimler, 19 Watchwater Way, Rockville, Md. 20850

[22] Filed: June 14, 1974

[21] Appl. No.: 480,185

[52] U.S. Cl................. 340/2; 178/DIG. 2; 340/8 R; 340/13 R; 350/96 B
[51] Int. Cl.²...................... H04R 1/44; H04R 23/00
[58] Field of Search........... 340/3 C, 5 MP, 8 R, 13, 340/2; 178/DIG. 2; 350/96 B

[56] References Cited
UNITED STATES PATENTS

| | | | |
|---|---|---|---|
| 3,206,719 | 9/1965 | Pure......................................... | 340/2 |
| 3,401,232 | 9/1968 | Goldhammer et al......... | 178/DIG. 2 |
| 3,586,563 | 6/1971 | Fukami et al..................... | 350/96 B |
| 3,701,990 | 10/1972 | Tuttle................................. | 340/6 R |
| 3,784,805 | 1/1974 | Rolle................................... | 340/3 R |
| 3,831,137 | 8/1974 | Cuomo............................... | 340/8 R |

*Primary Examiner*—Richard A. Farley
*Attorney, Agent, or Firm*—R. S. Sciascia; J. A. Cooke; Sol Sheinbein

[57] ABSTRACT

An opto-acoustic hydrophone converting acoustic signals to corresponding modulated optical signals and transmitting the converted signals via a fiber optics cable to a sonobuoy. Light reflected from a mirror or equivalent oscillating in accordance to received acoustic signals is transmitted via fiber optics to a sonobuoy for further transmission.

2 Claims, 3 Drawing Figures

PATENTED SEP 2 1975          3,903,496
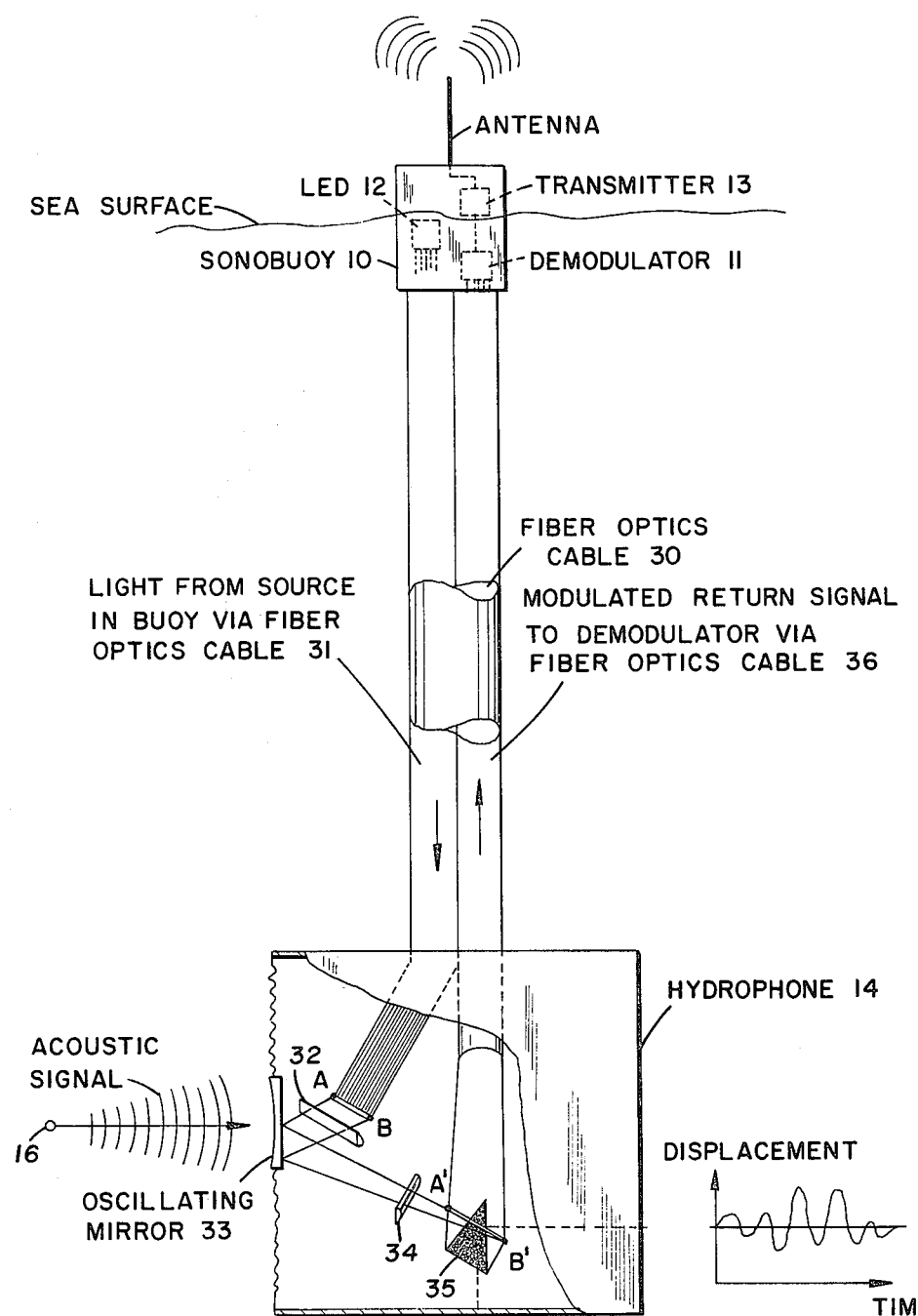
FIG. 1
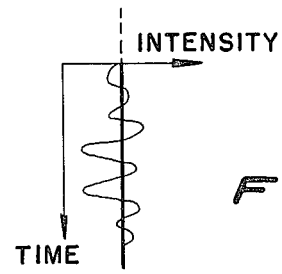
FIG. 2(a)
FIG. 2(b)

OPTO-ACOUSTIC HYDROPHONE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to hydrophones, and more specifically to opto-acoustic hydrophones.

In current acoustic hydrophone systems, electrical cables are used to transmit information (converted acoustic signals to modulated electrical signal) from a submerged acoustic hydrophone to a remote location. The employment of electrical cables has been found to be bulky and heavy as well as deficient due to electrical leakage. Additional problems encountered when using electrical cables in hydrophones have been: Crosstalk between elements in a cable, radiation, common ground requirements between source and receiver, short circuits due to moisture in the transmission cable, reflection and ringing, inability to employ in areas where volatile fumes exist, copper shortage and low resistance to fires. Due to the aforementioned problems, a substitute for electrical cables in hydrophones has been desired.

Prior to 1970, optical fibers for use in transmission of optical signal information were not practical over distances greater than approximately 100 feet. This was due primarily to optical losses introduced by absorption and scattering which resulted in attenuation on the order of 1000 dB/km in the commercially available fibers at the time. Since then, fibers of any desired length with attenuations of 20 dB/km have become commercially available, enabling transmission over several kilometers without the need for repeaters. More recently, attenuations of about 2dB/km have been achieved in very high quality fibers, but of relatively short lengths on the order of one-half km.

Accordingly, there is provided an opto-acoustic hydrophone converting received acoustic signals to corresponding optical signals. A light source in the sonobuoy at the surface supplies light via half a fiber optics cable to form a line source of light in the hydrophone. This light is directed at an oscillating mirror which is caused to move in accordance with the acoustic signals received. The mirror motion produces a reflected moving light upon the triangular shaped end of the other half of the fiber optics cable which transmits the optical signal corresponding to the acoustic signal back to the demodulator in the buoy.

OBJECTS OF THE INVENTION

It is therefore an object of the present invention to provide an opto-acoustic hydrophone.

Another object of the present invention is to permit the use of a fiber optics cable to transmit light to the hydrophone from a remote source for acoustic modulation at the hydrophone.

Another object of the present invention is to permit the use of a fiber optics cable to transmit acoustically derived information from a hydrophone to a remote location such as a sonobuoy.

Yet another object of the present invention is to provide an opto-acoustic hydrophone for converting acoustic signals to correspondingly modulated optical signals employing a remote source of power.

Still another object of the present invention is to provide a light and compact hydrophone not subject to radiation, moisture or electrical problems.

Other objects, advantages and features of the present invention will be better understood from the following description of one particular nonlimitative application in the form of preferred but non-exclusive embodiments considered in conjunction with the accompanying drawings wherein:

FIG. 1 is a schematic drawing illustrating an opto-acoustic hydrophone embodiment according to the teachings of the invention; and FIGS. 2($a$) and 2($b$) are graphs illustrating displacement and intensity as functions of time for optical signals produced in the hydrophone.

DESCRIPTION OF THE PREFERRED EMBODIMENTS

Referring now to FIG. 1 there is shown an opto-acoustic hydrophone 14 not requiring any electronics or electrical power in the hydrophone. A light source, such as a light emitting diode (LED) 12 is located in the sonobuoy 10, and provides an optical input to the hydrophone 14 via the half 31 of optical waveguides such as fiber optics cable 30. The end of this half of the cable 31 is line shaped to form a line source of light at AB. Light from AB is directed through a focussing cylindrical lens 32 to an oscillating mirror 33 which moves in accordance with acoustic signals 16 received at the hydrophone 14. The motion of mirror 33 produces a moving line of relected light A' B' which is focused by a second focussing cylindrical lens 34 on the triangularly shaped end 35 of the other half 36 of the fiber optics cable 30. As the light A' B' moves between the apex and base of this triangular end, it is incident on a changing number of fibers which varies as a linear function of displacement of light A' B'. The optical signal returned to the demodulator 11 in sonobuoy 10 via fiber optics cable 36 will, therefore, vary in direct proportion to the displacement and therefore in accordance with the acoustic signal received. After demodulation, the converted signal is transmitted by transmitter 13 coupled to demodulator 11. FIG. 2 ($a$) is a graph illustrating the displacement y of the light line A' B' as a function of time caused by the incident acoustic signal, and FIG. 2 ($b$) is a graph illustrating the intensity of the transmitted light as a function of time.

It is therefore seen from the above description of a preferred embodiment of the invention that there has been provided an opto-acoustic hydrophone employing fiber optics in place of electrical cables. This reduces the size and weight and eliminates electrical problems currently encountered in sonobuoy-type systems employing electrical cables, such as leakage, radiation, moisture, etc.

While the principles of the invention have now been made clear in an illustrative embodiment, obvious modifications particularly adapted for specific applications, environments and operating requirements may be made without departing from the principles. For example, the shape of the fiber optics cable 35 may be changed from triangular or linear to logarithmic, (resulting in a logarthmic output) or sinusoidal or step function. Further, the fiber optics cable 35 may be coupled to one end of a solid glass cylinder, the other end of which is meshed in any of the aforementioned shapes. Further, any suitably mounted optical device, such as a prism, may replace mirror 33 to reflect or refract modulated optical signals for transmission. It is therefore not desired to limit the invention to the exact details shown except insofar as they may be defined in the following claims.

What is claimed as new and desired to be secured by Letters Patent of the United States is:

1. An opto-acoustic hydrophone-sonobuoy system comprising:
   a fiber optics cable comprising of a first half and a second half between said sonobuoy and said hydrophone;
   a source of light in said sonobuoy for supplying an optical signal from said sonobuoy to said hydrophone through said first half of said fiber optics cable;
   an oscillating mirror in said hydrophone moving in accordance with received acoustic signals, said optical signal directed at said mirror for reflecting a moving line of light at said optical signal to said second half of said fiber optics cable, said signal varying in accordance to received acoustic signals;
   whereby said reflected optical signal is transmitted from said hydrophone to said sonobuoy through said second half of said fiber optics cable.

2. An opto-acoustic hydrophone sonobuoy system as recited in claim 1 wherein the end of said first half of said fiber optics cable is line shaped and wherein the end of said second half of said fiber optics cable is triangular shaped.

* * * * *